United States Patent
Recher et al.

(10) Patent No.: US 8,487,046 B2
(45) Date of Patent: Jul. 16, 2013

(54) POLYCYCLOOLEFIN (PCO) THERMOSET ASSEMBLY AND PROCESS FOR ITS PREPARATION

(75) Inventors: Gilles Recher, Marcq en Baroeul (FR); Nicolas Lessart, Barlin (FR); Naoki Nishioka, Okayama (JP)

(73) Assignee: RIMTEC Corporation, Tokyo (JP)

( * ) Notice: Subject to any disclaimer, the term of this patent is extended or adjusted under 35 U.S.C. 154(b) by 564 days.

(21) Appl. No.: 12/680,076

(22) PCT Filed: Sep. 26, 2008

(86) PCT No.: PCT/EP2008/008235
§ 371 (c)(1),
(2), (4) Date: Mar. 25, 2010

(87) PCT Pub. No.: WO2009/040135
PCT Pub. Date: Apr. 2, 2009

(65) Prior Publication Data
US 2010/0210783 A1    Aug. 19, 2010

(30) Foreign Application Priority Data
Sep. 28, 2007 (EP) ..................... 07291171

(51) Int. Cl.
*C08L 45/00* (2006.01)
*C08F 4/00* (2006.01)
*C08F 251/00* (2006.01)

(52) U.S. Cl.
USPC ........................................ 525/210; 525/245

(58) Field of Classification Search
USPC ................................. 525/210, 245
See application file for complete search history.

(56) References Cited

U.S. PATENT DOCUMENTS 6,872,792 B2 * 3/2005 Kendall et al. ............... 526/161
2003/0058812 A1   3/2003 Kendall et al.

FOREIGN PATENT DOCUMENTS

| JP | 2000-336320 A | 12/2000 |
|---|---|---|
| WO | 97/38036 A1 | 10/1997 |
| WO | 03/000764 A2 | 1/2003 |
| WO | 03/031505 A1 | 4/2003 |

OTHER PUBLICATIONS

T.M. Trnka et al., "The Development of L2×2Ru=CHR Olefin Metathesis Catalysts: An Organometallic Success Story", Am. Chem. Res., vol. 34, pp. 18-29 (2001).—XP-002951799.
R.H. Grubbs et al., "The Development of Functional Group Tolerant Romp Catalysts", J.M.S.—Pure Appl. Chem., A31 (11), pp. 1829-1833 (1994).
C.W. Bielawski et al., "Highly Efficient Ring-Opening Metathesis Polymerization (ROMP) Using New Ruthenium Catalysts Containing N-Heterocyclic Carbene Ligands", Agnew. Chem. Int. Ed., 39(16), pp. 2903-2906 (2000).

* cited by examiner

*Primary Examiner* — Nathan M Nutter
(74) *Attorney, Agent, or Firm* — Edwards Wildman Palmer LLP; Peter F. Corless; Christine C. O'Day

(57) ABSTRACT

The present invention relates to a polycycloolefin (PCO) thermoset network assembly and a process for its preparation obtainable by polymerising a first reactive composition comprising a norbornene-type cycloolefin monomer in the presence of a Mo- or W-catalyst to obtain a PCO-Mo/W-network and polymerising a second reactive composition comprising a nor-bornene-type cycloolefin monomer in the presence of a Ru-catalyst on said PCO-Mo/W-network to obtain a PCO thermoset network assembly.

20 Claims, No Drawings

POLYCYCLOOLEFIN (PCO) THERMOSET ASSEMBLY AND PROCESS FOR ITS PREPARATION

FIELD OF THE DISCLOSURE

The present invention relates to a poylcycloolefin (PCO) thermoset network assembly and a process for its preparation.

BACKGROUND OF THE INVENTION

Polymers of cycloolefins containing a norbornene moiety are well-known. Such polymers can be prepared by ring-opening polymerisation of monomers in the presence of a metathesis catalyst system. Ring-opening metathesis polymerisation (hereinafter referred to as ROMP) results in a thermoset network. By thermoset network the skilled person understands a 3 dimensional polymer structure.

Thermoset polymers usually bond on themselves, but require a surface preparation to obtain optimal structural bonding, typically sanding, sandblasting or using peel ply fabric. Solvent wipe is not active enough.

Thermoset polymers prepared from norbornene-type cycloolefin monomers using W or Mo based catalysts, however, do not bond on themselves like the other thermoset polymers, even when preparing the surface by sanding, sandblasting or using peel ply fabric.

In order to bond together two norbornene-type polycycloolefin systems, an adhesive is required, the use of which is disadvantageous in that it has usually not the same properties as the thermoset network prepared from the norbornene-type cycloolefin monomers using ROMP as polymerisation mechanism.

For example, in view of the difference in thermal expansion between the adhesive and the parts of the network assembly, bonding lines can be observed at the surface of the network assembly which gives the final product a poor optical appearance.

As another example, the adhesive used to bond together the parts of the network assembly has not the same chemical resistance as the thermoset network so that there occurs the problem that the parts of the network assembly become separated again when the final product is exposed to a harsh chemical environment.

WO 97/38036 describes a metathesisable composition that includes a mixture of a thermal carbene-free ruthenium catalyst and a thermal ruthenium carbene catalyst. The polymers resulting from the metathesis polymerisation are said to be suitable "as adhesives for bonding substrates having low surface energies (for example Teflon, polyethylene, polypropylene)." The compositions disclosed in WO 97/38036 are also said to be useful as "thermally curable adhesives" and as protective coatings on substrates. However, there is no example of a specific adhesive or coating formulation.

WO 03/000764 A2 relates to an adhesive or coating composition prepared by mixing together at least one metathesisable highly-reactive cycloolefin (for example a norbornadiene) and a metathesis catalyst. Another embodiment described therein is a two-part adhesive or coating system wherein the first part includes at least one first metathesisable material, and the second part includes at least one liquid metathesis oligomer or polymer and a metathesis catalyst.

Thus, it is the problem underlying the present invention to provide a polycycloolefin network assembly which avoids the use of an adhesive to bond together thermoset networks prepared from norbornene-type cycloolefin monomers.

SUMMARY OF THE DISCLOSURE

The present invention relates to a:
(i) polycycloolefin (PCO) thermoset network assembly obtainable by polymerising a first reactive composition comprising a norbornene-type cycloolefin monomer in the presence of a Mo- or W-catalyst to obtain a PCO-Mo/W-network and polymerising a second reactive composition comprising a norbornene-type cycloolefin monomer in the presence of a Ru-catalyst on said PCO-Mo/W-network to obtain a PCO network assembly and
(ii) polycycloolefin (PCO) thermoset network assembly obtainable by polymerising a first reactive composition comprising a norbornene-type cycloolefin monomer in the presence of a Ru-catalyst to obtain a first PCO-Ru-network and polymerising a second reactive composition comprising a norbornene-type cycloolefin monomer in the presence of a Mo- or W-catalyst on said PCO-Ru-network to obtain a PCO network assembly.

DETAILED DESCRIPTION OF INVENTION

It has been surprisingly found that the use of two different kinds of metathesis catalysts (a) and (b), i.e., the use of a Mo- or W-catalyst on the one hand and the use of a Ru-catalyst on the other hand, to prepare two thermoset networks by ROMP enables bonding of the two networks with avoiding the use of an adhesive.

The norbornene-type cycloolefin monomers used in the present invention are any polycyclic compounds which are characterised by the presence of at least one norbornene moiety in its structure identified below:

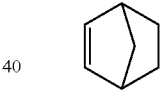

Especially, a polycyclic norbornene-type cycloolefin monomer having three or more aliphatic rings is preferably used from the viewpoint of that a thermoset network excellent in heatproof can be obtained.

Examples of the norbornene-type cycloolefin monomers include a bicyclic compound such as norbornene or norbornadiene; a tricyclic compound such as dicyclopentadiene (dimer of cyclopentadienes) or dihydrodicyclopentadiene; a tetracyclic compound such as tetracyclododecene; a pentacyclic compound such as a trimer of cyclopentadienes; a hexacyclic compound such as hexacycloheptadecene; a heptacyclic compound such as a tetramer of cyclopentadienes; and the like.

These norbornene-type cycloolefin monomers can be substituted with one or more of any substituents which do not poison or deactivate the polymerisation catalyst. Examples of the substituents include an alkyl group having 1 to 6 carbon atoms such as methyl group, ethyl group, propyl group or butyl group; an alkenyl group having 2 to 6 carbon atoms such as vinyl group; an alkylidene group having 2 to 6 carbon atoms such as ethylidene; a saturated or unsaturated hydrocarbon cyclic group having 3 to 12 carbon atoms such as cyclopropyl, cyclobutyl, cyclopentyl, cyclohexyl and the like; an aryl group having 6 to 14 carbon atoms such as phenyl group, tolyl group or naphthyl group; a polar group such as an ester group (—C(=O)O—), ether group (—O—), cyano group (—CN) or a halogen atom; and the like. In a preferred embodiment, the substituents are selected from alkyl groups having 1 to 2 carbon atoms. These monomers can be used alone or in combination of two kinds or more.

From the viewpoints of easy availability, excellence in reactivity, and property to make the resulting network highly heatproof, monomers selected from the group consisting of the tricyclic compounds, the tetracyclic compounds and the pentacyclic compounds are preferably used.

Since the resulting network should be thermoset, at least one crosslinkable monomer having two or more double bonds such as a trimer of cyclopentadiene or dicyclopentadiene has to be used. The number of double bonds in the monomer is preferably from 2 to 4, more preferably from 2 to 3. The content of such a crosslinkable monomer in the norbornene-type cycloolefin monomers is preferably from 1 to 100% by weight, more preferably from 50 to 100% by weight, still more preferably from 80 to 95% by weight. A preferred composition consists of, for example, about 10% by weight trimer of cyclopentadiene and about 90% by weight dicyclopentadiene.

Examples of the preferred norbornene-type cycloolefin monomers include 2-norbornene, 5-methyl-2-norbornene, 5,6-dimethyl-2-norbornene, 5-ethyl-2-norbornene, 5-butyl-2-norbornene, 5-hexyl-2-norbornene, 5-octyl-2-norbornene, 5-phenyl-2-norbornene, 5-dodecyl-2-norbornene, ethylidenenorbornene methyltetracyclododecene, 2,5-norbornadiene, 2-propyl-2,5-norbornadiene, 2-ethyl-2,5-norbornadiene, 1,4-bis[2-(2,5-norbornadienyl)]butane, 1-methyl-2,5-norbornadiene, 7-isopropylidene-2,5-norbornadiene, 7-sec-butylidene-2,5-norbornadiene, dicyclopentadiene, trimer of cyclopentadiene, methylcyclopentadiene dimer and the like. Incidentally, methylnorbornene (MNB), methyltetracyclododecene (MTD), dicyclopentadiene (DCP), and methylcyclopentadiene dimer (MCDD) having the following structures:

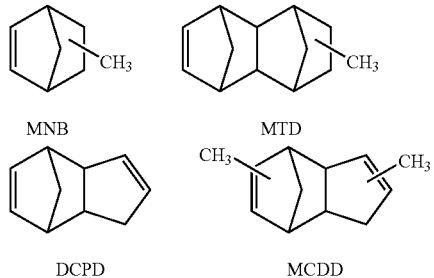

MNB  MTD

DCPD  MCDD

The norbornene-type cycloolefin monomers also include monomers disclosed in U.S. Pat. No. 4,301,306 and U.S. Pat. No. 4,324,717, all of which contain the norbornene moiety depicted above.

Among the above-mentioned norbornene-type cycloolefin monomers, the use of dicyclopentadiene is particularly preferred.

Optionally, there can be used as a co-monomer a single ring cycloolefin such as cyclobutene, cyclopentene, cyclopentadiene, cyclooctene, cyclododecene or the like, which can be ring-opening co-polymerised with the norbornene-type cycloolefin monomer, as far as the effect of the present invention is not hindered.

The content of norbornene-type cycloolefin monomers in such mixtures is preferably from 50 to 100% by weight, more preferably from 70 to 100% by weight, most preferably from 90 to 100% by weight.

In the present invention, the norbornene-type cycloolefin monomers are polymerised by using metathesis catalysts, especially, Mo- or W-catalysts, or Ru-catalyst. In this type of polymerisation the rings of the monomers are opened at a norbornenyl double bond to form polymers.

The Mo- or W-catalyst used in this invention can be basically selected from known ring-opening metathesis catalysts. These catalysts include the halides, oxyhalides, oxides, organo-ammonium salts, oxyacid salts, heteropolyacid salts, and the like of tungsten and molybdenum. Among them, the halides, oxyhalides and organo-ammonium salts are preferably used with the organo-ammonium salts being more preferably used.

In a preferred embodiment the Mo- or W-catalyst is used in a monomer solution to facilitate mixing the catalyst with the other ingredients of the polymerisation system.

For example, the catalysts can be used in the form of organo-ammonium molybdates and tungstates as described in U.S. Pat. No. 4,426,502. These catalysts are soluble in cycloolefin monomers, can be handled at room temperature in a room environment since they are stable, and they do not prematurely polymerise at room temperature when mixed with cycloolefins.

The organo-ammonium molybdates and tungstates suitable herein as catalysts are defined as follows:

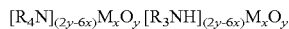

where O represents oxygen; M represents either molybdenum or tungsten; x and y represent the number of M and O atoms, respectively, in the molecule based on the valence of +6 for molybdenum, +6 for tungsten and −2 for oxygen.

In a preferred embodiment the R radicals are selected from alkyl groups each containing 1 to 18 carbon atoms wherein the sum of carbon atoms on all the R radicals is from 20 to 72, more preferably from 25 to 48. In a preferred embodiment the radicals are selected from alkyl groups each containing from 1 to 18 carbon atoms wherein the sum of carbon atoms on all of the radicals is from 15 to 54, more preferably from 21 to 42.

Specific examples of suitable organo-ammonium molybdates and tungstates described herein include tridodecylammonium molybdates and tungstates, methyltricaprylammonium molybdates and tungstates, tri(tridecyl)ammonium molybdates and tungstates, octylammonium molybdates and tungstates, and the like.

In addition to the above mentioned Mo-catalysts, there can be also preferably used the following catalysts: 2,6-diisopropylphenylimidoneophylidene molybdenum (VI) bis(hexafluoro-t-butoxide) and 2,6-diisopropylphenylimido-neophylidene molybdenum (VI) bis(t-butoxide). Such molybdenum catalysts are described in Bazan, G. C., Oskam, J. H., Cho, H. N., Park, L. Y., Schrock, R. R., *Journal of the American Chemical Society*, 1991, 113, 6899; U.S. Pat. No. 4,727,215; Alexander, B.; La, D. S.; Cefalo, D. R.; Hoveyda, A. H.; Schrock, R. R. *J. Am. Chem. Soc.* 1998, 120, 4041; Zhu, S.; Cefalo, D. R.; La, D. S.; Jamieson, J. Y.; Davis, W. M.; Hoveyda, A. H.; Schrock, R. R. *J. Am. Chem. Soc.* 1999, 121, 8251; and Aeilts, S. L.; Cefalo, D. R.; Bonitatebus, Jr., P. J.; Houser, J. H.; Hoveyda, A. H.; Schrock, R. R. *Angew. Chem. Int. Ed.* 2001, 40, 1452.

The Mo- or W-catalyst or a mixture thereof is generally employed at a level of about 0.0001 to 50 millimoles molybdenum or tungsten, preferably 0.0002 to 20 millimoles molybdenum or tungsten, per mole of total norbornene-type cycloolefin monomers.

The Ru-catalyst used in this invention can be also basically selected from known ring-opening metathesis catalysts. For example, such a ruthenium catalyst is described in the following references:

WO 2003011455 A1
US 2002177710 A1
WO 2003020775 A1
WO 2002102707 A2
WO 2002083742 A2
U.S. Pat. No. 6,465,590 B1
WO 2002079127 A1
WO 2002079126 A1
WO 2002076613 A1
U.S. Pat. No. 6,376,690 B1
WO 2002020535 A1
WO 2002079208 A2
WO 2001036368 A2
EP 1301458 A1
U.S. Pat. No. 6,310,121 B1
EP 1180108 A2
EP 1180107 A1
EP 1248764 A2
EP 879251 A1
EP 1235871 A1
U.S. Pat. No. 5,916,983 A
EP 1042333 A1
EP 1056538 A1
U.S. Pat. No. 5,811,515 A
EP 970069 A1
EP 942914 A1
U.S. Pat. No. 5,728,785 A
EP 879251 A1
EP 880357 A1
EP 865449 A1
EP 842200 A1
EP 837885 A1
EP 773948 A1
EP 1251135 A2
EP 1253156 A2
WO 9320111 A2
U.S. Pat. No. 4,883,851 A
U.S. Pat. No. 4,945,144 A
U.S. Pat. No. 4,945,141 A
U.S. Pat. No. 4,945,135 A

In addition to the above mentioned Ru-catalysts, there can be preferably used as a Ru-catalyst a Ru carbene complex in which Ru is directly bonded with a carbene compound via bonding of Ru and a carbene carbon (>C:) to give the structure of Ru=C. Here, the carbene compound refers to a generic name of the compound having a carbene carbon, that is, a methylene radical group.

For example, WO 03/000764 A2 discloses such Ru carbene complexes having a structure represented by the following formula:

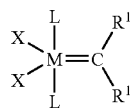

wherein M is, inter alia, Ru; $R^1$ is a given organic group; X is an anionic ligand group; and L is a neutral electron donor group.

Among the complexes disclosed therein, there can be preferably used tricyclohexyl phosphine ruthenium carbenes, especially bis(tricyclohexylphosphine)benzylidene ruthenium dichloride (designated herein by $RuCl_2(PCy_3)_2$=CHPh). In addition to WO 03/000764 A2, such Ru carbene catalysts are described, for example, in U.S. Pat. No. 5,312, 940 and 5,342,909; Schwab, P.; Grubbs, R. H.; Ziller, J. W., *Journal of the American Chemical Society*, 1996, 118, 100; Schwab, P.; France, M. B., Ziller, J. W.; Grubbs, R. H., *Angew. Chem. Int. Ed.*, 1995, 34, 2039; and Nguyen, S. T.; Grubbs, R. H., *Journal of the American Chemical Society*, 1993, 115, 9858.

Additional catalysts within the above formula as described in WO 03/000764 A2 are those catalysts wherein the L groups are trialkylphosphines, imidazol-2-ylidene or dihydroimidazol-2-ylidene based systems, either mixed or the same. Examples of these catalysts include N,N'-disubstituted 4,5-dihydroimidazol-2-ylidene substituted ruthenium carbene, a N,N'-disubstituted imidazol-2-ylidene substituted ruthenium carbene, a mixed phosphine-dihydroimidazol-2-ylidene substituted ruthenium carbene or a mixed phosphine-imidazol-2-ylidene substituted ruthenium carbene. Particularly illustrative are tricyclohexylphosphine[1,3-bis(2,4,6-trimethylphenyl)-4,5-dihydroimidazol-2-ylidene] [benzylidene]ruthenium dichloride (herein referred to as $RuCl_2(PCy_3)(IHMes)$=CHPh), or tricyclohexylphosphine[1, 3-bis(2,3,6-trimethylphenyl)-4,5-imidazol-2-ylidene][benzylidene]-ruthenium dichloride (herein referred to as $RuCl_2(PCy_3)(IMes)$=CHPh).

Further useful Ru catalysts are shown on page 20, line 10 through page 28, line 5 of WO 03/000764 A2.

Further useful Ru catalysts are described in articles such as Ahmed, M.; Garrett, A. G. M.; Braddock, D. C.; Cramp, S. M.; Procopoiou, P. A. *Tetrahedron Letters* 1999, 40, 8657; Olivan, M.; Caulton, K. G. *J. Chem. Soc., Chem. Commun.* 1997, 1733; Amoroso, D.; Fogg, D. E. *Macromolecules* 2000, 33, 2815; Fürstner, A.; Hill, A. F.; Liebl, M.; Wilton-Ely, J. D. E. T. *J. Chem. Soc., Chem. Commun.,* 1999, 601; Robson, D. A.; Gibson, V. C.; Davies, R. G.; North, M. *Macromolecules* 1999, 32, 6371; Schwab, P.; France, M. B.; Ziller, J. W.; Grubbs, R. H. *Angew. Chem. Int. Ed.* 1995, 34, 2039; Schwab, P.; Grubbs, R. H.; Ziller, J. W. *J. Am. Chem. Soc.* 1996, 118, 100; Ulman, M.; Belderrain, T. R.; Grubbs, R. H. *Tetrahedron Lett.* 2000, 4689; M. Scholl; S. Ding; C. W. Lee; Grubbs, R. H. *Organic Lett.* 1999, 1, 953; Scholl, M.; Trnka, T. M.; Morgan, J. P.; Grubbs, R. H. *Tetrahedron Lett.* 1999, 40, 2247; Belderrain, T. R.; Grubbs, R. H. *Organometallics* 1997, 16, 4001; Ulman, M.; Belderrain, T. R.; Grubbs, R. H. *Tetrahedron Lett.* 2000, 4689; Sanford, M. S.; Henling, L. M.; Day, M. W.; Grubbs, R. H. *Angew. Chem. Int. Ed.* 2000, 39, 3451; Lynn, D. M.; Mohr, B.; Grubbs, R. H.; Henling, L. M.; Day, M. W. *J. Am. Chem. Soc.* 2000, 122, 6601; Mohr, B.; Lynn, D. M.; Grubbs, R. H. *Organometallics* 1996, 15, 4317; Nguyen, S. T.; Grubbs, R. H.; Ziller, J. W. *J. Am. Chem. Soc.* 1993, 115, 9858; Weskamp, T.; Schattenmann, W. C.; Spiegler, M.; Herrmann, W. A. *Angew. Chem. Int. Ed.* 1998, 37, 2490; Hansen, S. M.; Volland, M. A. O.; Rominger, F.; Eisentrager, F.; Hofmann, P. *Angew. Chem. Int. Ed.* 1999, 38, 1273; Kingsbury, J. S.; Harrity, J. P. A.; Bonitatebus, P. J.; Hoveyda, A. H. *J. Am. Chem. Soc.* 1999, 121, 791; Wolf, J.; Stuer, W.; Grunwald, C.; Werner, H.; Schwab, P.; Schulz, M. *Angew. Chem. Int. Ed.* 1998, 37, 1124; Gessler, S., Randl, S., Blechert, S., *Tetrahedron Lett.* 2000, 41, 9973; and U.S. Pat. No. 6,107,420. Further suitable Ru catalysts and catalytic systems for use in the present invention are described in WO 03/062253 A1. In particular, this document discloses penta-coordinated Schiff-base-substituted monometallic complexes of the general formulae (IA) and (IB):

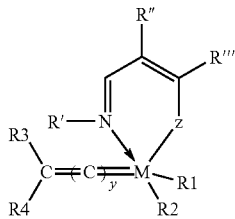

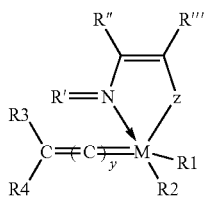

wherein:
- M is, inter alia, ruthenium,
- Z is selected from the group consisting of oxygen, sulphur, selenium, NR"", PR"", AsR"" and SbR"";
- R", R''' and R"" are each a radical independently selected from the group consisting of hydrogen, $C_{1-6}$ alkyl, $C_{3-10}$ cycloalkyl, $C_{1-6}$ alkyl-$C_{1-6}$ alkoxysilyl, $C_{1-6}$ alkyl-aryloxysilyl, $C_{1-6}$ alkyl-$C_{3-10}$ cycloalkoxysilyl, aryl and heteroaryl, or R" and R''' together form an aryl or heteroaryl radical, each said radical being optionally substituted with one or more, preferably 1 to 3, substituents $R_5$ each independently selected from the group consisting of halogen atoms, $C_{1-6}$ alkyl, $C_{1-6}$ alkoxy, aryl, alkylsulfonate, arylsulfonate, alkylphosphonate, arylphosphonate, $C_{1-6}$ alkyl-$C_{1-6}$ alkoxysilyl, $C_{1-6}$ alkylaryloxysilyl, $C_{1-6}$ alkyl-$C_{3-10}$ cycloalkoxysilyl, alkylammonium and arylammonium;
- R' is either as defined for R", R''' and R"" when included in a compound having the general formula (IA) or, when included in a compound having the general formula (IB), is selected from the group consisting of $C_{1-6}$ alkylene and $C_{3-8}$ cycloalkylene, the said alkylene or cycloalkylene group being optionally substituted with one or more substituents $R_5$;
- $R_1$ is a constraint steric hindrance group having a $pK_a$ of at least 15;
- $R_2$ is an anionic ligand;
- $R_3$ and $R_4$ are each hydrogen or a hydrocarbon radical selected from the group consisting of $C_{1-20}$ alkyl, $C_{1-20}$ alkenyl, $C_{1-20}$ alkynyl, $C_{1-20}$ carboxylate, $C_{1-20}$ alkoxy, $C_{1-20}$ alkenyloxy, $C_{1-20}$ alkynyloxy, aryl, aryloxy, $C_{1-20}$ alkoxycarbonyl, $C_{1-8}$ alkylthio, $C_{1-20}$ alkylsulfonyl, $C_{1-20}$ alkylsulfinyl $C_{1-20}$ alkylsulfonate, arylsulfonate, $C_{1-20}$ alkylphosphonate, arylphosphonate, $C_{1-20}$ alkylammonium and arylammonium;
- R' and one of $R_3$ and $R_4$ may be bonded to each other to form a bidentate ligand;
- R''' and R"" may be bonded to each other to form an aliphatic ring system including a heteroatom selected from the group consisting of nitrogen, phosphorous, arsenic and antimony;
- $R_3$ and $R_4$ together may form a fused aromatic ring system, and
- y represents the number of $sp_2$ carbon atoms between M and the carbon atom bearing $R_3$ and $R_4$ and is an integer from 0 to 3 inclusive, salts, solvates and enantiomers thereof.

In the present invention the above mentioned substituent $R_5$ can also include a nitro group.

Further, WO 03/062253 A1 also discloses tetra-coordinated Schiff-base-substituted monometallic complexes and multi-coordinated Schiff-base-substituted bimetallic complexes. These complexes can be also used as a Ru catalyst in the present invention.

As further penta-coordinated Schiff-base-substituted monometallic complexes, the following compounds are especially preferable, which compound are described in co-pending European patent application 07 290 454.3 filed by the same applicant on 13.4.2007:

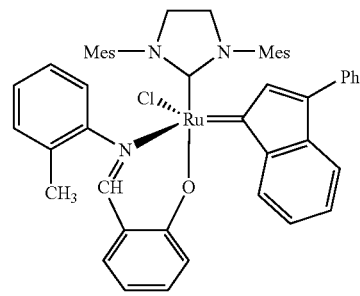

(VC 843)

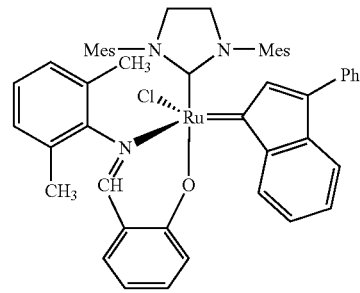

(VC 857)

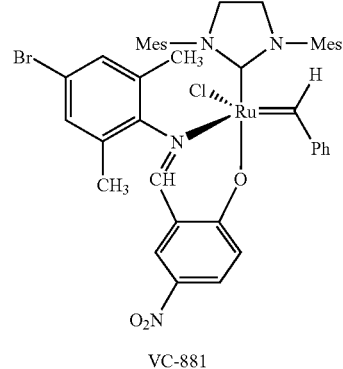

(VC 881)

VC-881

This application also discloses further Ru-catalysts for use in the present invention.

Further Ru catalysts for use in the present invention can be obtained by bringing into contact of a multi-coordinated metallic complex, preferably an at least tetra-coordinated metallic complex comprising a multidentate Schiff base ligand and one or more other ligands (such as, but not limited to, the metal complexes of WO 03/062253 or WO 2005/035121), with an activating metal or silicon halide compound under conditions such that at least partial cleavage of a bond between the metal and the multidentate Schiff base ligand of said multi-coordinated metallic complex occurs.

The activating metal halide compound is generally a halometal compound which has the following formula:

$R_mYX_n$ where m is 0 to 4 and n is 1 to 5. R is individually selected from organic radicals selected from hydrogen, alkyl, alkenyl, alkoxy, aryl, alkaryl and saturated and unsaturated cyclic groups. The quantity Y is a metal selected from tin, lead, magnesium, antimony, boron, germanium and silicon. The quantity X is individually selected from halogens which include chlorine, bromine, iodine and fluorine, preferably chlorine.

The activating silicon halide compound is preferably selected from organic chlorosilanes of the following formula:

where m is 0 to 3, and n is 1 to 4; R is individually selected from hydrogen, alkyl groups of 1 to 12 carbon atoms, alkoxy groups of 1 to 12 carbon atoms, alkenyl groups of 2 to 12 carbon atoms, aryl groups of 6 to 18 carbon atoms, alkaryl groups wherein there is at least one alkyl substituent on the aryl moiety containing 1 to 4 carbon atoms, and saturated and unsaturated monocyclic, dicyclic and polycyclic groups containing a total of 5 to 12 carbon atoms. In an especially preferred embodiment R is selected from hydrogen, alkyl and alkoxy groups containing 1 to 6 carbon atoms. Specific examples of preferred activating silicon halide compound include the following chlorosilanes: dimethylmonochlorosilane, dimethyldichlorosilane, diphenyldichlorosilane, tetrachlorosilane, and the like.

The amount of these activating compounds is in the range of 10 to 200 halide equivalents per mole of catalyst, preferably 20 to 80 halide equivalents, and most preferably about 40 halide equivalents.

For example, when starting from the above-mentioned penta-coordinated Schiff-base-substituted monometallic complex, the resulting complex may for instance take the form of one or more monometallic species being represented by the general formula (IA)':

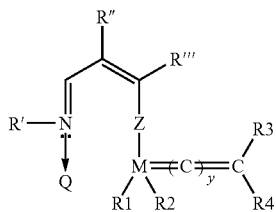

or by the general formula (IB)':

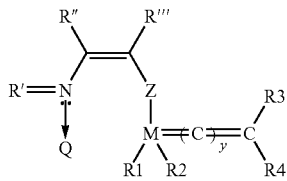

wherein R', R'', R''', R1, R2, R3, R4, M, y, and z have the same meanings as those of the formulae (IA) and (IB), and Q is an activating metal or silicon compound such as defined above, including salts, solvates and enantiomers thereof.

When starting from a multi-coordinated Schiff-base-substituted bimetallic complex, the resulting complex can also be obtained as in the case of penta-coordinated Schiff-base-substituted monometallic complex used:

The above Ru catalysts can be suitably obtained by reacting the activating metal or silicon halide compound such as defined hereinabove with said multi-coordinated metal complex (preferably an at least tetra-coordinated metallic complex comprising a multidentate Schiff base ligand) in the presence of at least one further reactant having the formula RYH, wherein Y is selected from the group consisting of oxygen, sulfur and selenium, and R is selected from the group consisting of hydrogen, aryl, arylalkyl, heterocyclic, heterocyclic-substituted alkyl and $C_{1-7}$ alkyl. According to this specific embodiment, a strong acid (hydrogen halide) is formed in situ by the reaction of said metal or silicon activating compound with said further reactant having the formula RYH. This alternative mechanism is, however, quite effective in the catalysis of methathesis reactions since it provides a more random distribution of the strong acid in the reaction mixture than if the same strong acid is introduced directly in the presence of the multi-coordinated metal complex.

The amount of these further reactant RYH is in the range of 1 to 100 halide equivalents per mole of the activating metal, preferably 2 to 100 halide equivalents, and most preferably about 50 halide equivalents.

The Ru catalysts as obtained by using the activating metal or silicon halide compound optionally with further reactant RYH may be produced in situ during metathesis by introducing a suitable amount of the metal or silicon activating compound into the reaction mixture before, simultaneously with, or alternatively after the introduction of the starting Schiff base metal complex.

The activating metal or silicon halide compound and further reactant RYH can be preferably contained in the norbornene-type cycloolefin monomer or solution thereof.

The Ru-catalyst is generally employed at a level of about 0.005 to 50 millimoles ruthenium, preferably 0.01 to 5 millimoles ruthenium, per mole of total norbornene-type cycloolefin monomers.

In the process of the present invention, the bulk polymerisation of norbornene-type cycloolefin monomers in the presence of the metathesis catalyst system can be carried out as follows:

For example the first reactive mixture is injected into a mold to create the first network as described below.

A preferred bulk ring-opening polymerisation method is to divide a norbornene-type cycloolefin monomer solution into two portions and to store them in separate containers. Into one container, the precursor of the metathesis catalyst is added to form one reactant solution and into the other, a co-catalyst is added to form the other reactant solution. Once the precursor of the metathesis catalyst and the co-catalyst are contacted with each other, the catalytically active species is formed. As such co-catalysts, the activating metal or silicon halide compound described above are selected for the ruthenium catalysts.

If a molybdenum compound is used as a catalyst, suitable co-catalysts are alkylaluminium halides. Specific examples of such alkylaluminium halides include ethylaluminiumdichloride, diethylaluminium monochloride, ethylaluminium sesquichloride, diethylaluminium iodide, ethylaluminium diiodide, trialkylaluminium, propylaluminium dichloride, propylaluminium diiodide, isobutylaluminium dichloride, ethylaluminium dibromide, methylaluminium sesquichloride and methylaluminium sesquibromide.

In addition, a modified alkylaluminium halide co-catalyst can be used which is described in U.S. Pat. No. 4,426,502. The co-catalyst is modified by pre-reacting an alkylaluminium halide with an alcohol or an active hydroxy-containing compound to form an alkoxyalkylaluminium halide or an aryloxyalkylaluminium halide which is then used in the polymerisation reaction.

The molar ratio of the alkylaluminium halide to the catalyst(s) used in the present invention is not critical and can be in the range of about 200:1 or more to 1:10, preferably from 10:1 to 2:1 of aluminium to molybdenum.

If a tungsten compound is used as a catalyst, suitable cocatalysts are selected from alkylaluminium compounds, alkylaluminium halide or alkylaluminium hydrides or a mixture thereof.

Specific examples of such alkylaluminium co-catalysts include triethylaluminium and triisobutylaluminium.

Specific examples of such alkylaluminium halides include dioctylaluminiumiodide, diethylaluminium iodide and ethylaluminium diiodide.

Specific examples of such alkylaluminium hydrides include triethylaluminium and diisobutylaluminium hydride.

The two reactant solutions are then mixed and injected into a mold. The bulk ring-opening polymerisation reaction is then carried out in the mold cavity.

Molds made of resin, wood, steel or aluminium can all be used safely. The mold cavity may be of any shape depending on the configuration of the desired product.

Further, a composite material can be set in a mold, wherein the composite material is made from inorganic material such as metal, glass, or ceramics, or organic material such as a polymer or elastomer. The shape of the composite material is not limited as long as the material does not have fluidity at the temperature of mold on polymerisation. When the composite material is set in a mold, a thermoset network assembly formed with the composite material can be obtained.

The two reactant solutions are mixed by using a conventional reaction injection mold (RIM) apparatus. In this case the two reactant solutions are stored in two separate vessels and serve as the source for the two reactant feed streams. The two streams are intimately mixed in the mixing head of the RIM apparatus (impingement mixing head) to form the reaction solution. The mixture is injected into a preheated metal mold and bulk polymerised to produce the first polymer network.

This invention is not limited to a two reactant stream process. A third reactant stream (or a plurality of streams) containing an additional reactant(s) or additive(s) can be employed in the present process.

The mold temperature employed is commonly greater than room temperature (e.g., above 30° C.), preferably between about 40 to 200° C., and more preferably between about 50 to 130° C. The mold pressure is commonly between about 0.01 to 10 MPa (0.1 to 100 kg/cm$^2$).

The polymerisation time can be determined as needed. However, the time from feeding the reactive solution into the mold cavity to the onset of the polymerisation preferably should be less than 20 minutes, preferably within 5 minutes, and more preferably within 2 minutes.

Depending on the nature of the catalyst used, the reactant solutions are stored under an inert gas atmosphere such as nitrogen, and also should be processed under such an inert atmosphere. However, the mold does not necessarily have to contain an inert gas.

The polymer properties of the matrix can be modified by the addition of additives such as antioxidants, filler materials, strengthening materials, pigments, colouring agents, foaming agents, flame retardants, lubricants, elastomers, and/or dicyclopentadiene type hydrogenated thermopolymer resins.

Suitable antioxidants include phenolic, phosphorus, or amine type compounds that are commonly used in plastics and rubbers.

Suitable fillers include inorganic materials such as milled glass, long glass fibres, glass mat, carbon black, talc, calcium carbonate, mica, and the like. Reinforcing fibres can be used in this invention to strengthen the outer layer.

A foaming agent can be placed in one or both of the reactant solutions. Suitable foaming agents include aliphatic hydrocarbons such as pentane, hexane, and the like, halohydrocarbons such as methylene chloride, trichlorofluoromethane, dichlorodifluoromethane, or polymer cells filed with expansion gas like Expan-cell from Akzo corp., Advancell from Sekisui corp. and the like; or inert gases such as nitrogen, argon, and the like.

Suitable elastomers include natural rubber, polybutadiene, polyisoprene, styrene-butadiene copolymer (SBR), styrene-butadiene-styrene block copolymer (SBS), styrene-isoprene-styrene block copolymer (SIS), ethylene-propylenediene terpolymer (EPDM), ethylene-vinyl acetate copolymer (EVA), and their hydrogenated derivatives. The addition of the elastomer to the reactant solution(s) improves reactant solution viscosity as well as the impact properties of the molded composite product.

The amount and type of elastomer used is determined by its molecular weight and by the initial viscosity desired in the reaction solution to which it is added as well as its ability to impact modify the resulting network. Amounts within the range of 1 to 10% by weight and preferably 2 to 5% by weight of the reaction solution can be used without causing an excessive increase in solution viscosity.

The reinforcing material may be placed in the mold cavity and then the reaction solution is fed into the cavity and allowed to polymerise in the presence of the reinforcing material. Alternatively, the fibre fillers can be mixed in the reactant solutions before their introduction into the mold. Examples of suitable reinforcing materials are glass fibres, aramid fibres, carbon fibres, ultrahigh molecular weight polyethylene fibres, metal fibres, polypropylene fibres, aluminium coated glass fibres, cotton, acrylic resin fibres, boron fibres, silicon carbide fibres, alumina fibres, and the like. The reinforcing materials can be in the form of long fibres, chopped strand type mat, fabric, chopped fibre, or many other forms suitable for providing reinforcement. The surface of these reinforcing materials can be treated with a silane coupling agent to improve their adhesion to the resin. There are no restrictions to the amount of reinforcing material utilised, but it is preferably not less than about 10 weight percent, more preferably between about 30 to 70 weight percent.

In the case of a catalyst that reacts too quickly to allow using the procedure described above, the catalyst is dissolved or suspended in an inert carrier such as toluene, mineral or synthetic oil, to create one of the reactant solutions, which contains catalyst(s) without monomers. The resulting reactant solution are then intimately mixed with other reactant solutions, which contain monomers without catalyst(s), in the mixing head of the injection equipment to form the reaction solution. The mixture is injected into a preheated metal mold and bulk polymerised to produce the first polymer network.

In case of using Ruthenium based catalyst, the first polymer network can also be prepared by methods known for thermoset polymers such as spraying, filament winding, casting in open or closed molds, pultrusion, rotational molding and centrifugation casting.

Once a first polycycloolefin network has been obtained, a second reactive composition is applied to the surface of said first network, wherein the second reactive composition comprises a catalyst different from the catalyst contained in the first reactive composition used to prepare the first polycycloolefin network. Thus, in case said first reactive composition comprises a Mo- or W-catalyst, the second reactive composition contains a Ru-catalyst.

On the contrary, if the first reactive composition comprises a Ru-catalyst, then the second reactive composition comprises a Mo- or W-catalyst.

Except for the catalyst, the two reactive compositions used to prepare the first and the second network may be identical.

In fact, according to a preferred embodiment of the claimed invention, the first and the second reactive compositions comprise the same norbornene-type cycloolefin monomer as described above. A particularly preferred norbornene-type cycloolefin monomer is dicyclopentadiene (DCP).

If the first reactive composition has the same or similar composition as the second reactive composition (except for the catalyst), a network assembly can be obtained which is essentially homogeneous, which network assembly thus differs from a network assembly wherein an adhesive is used to bond the first network to a second network resulting in an adhesive joint. In other words according to the present invention it is possible to obtain an assembly of 2 networks having essentially the same physical and chemical properties by adjusting the composition of the reactive compositions.

The second reactive composition is just polymerised on the first network in the presence of a catalyst that is different from the one used to prepare said first network.

This can be done in a number of ways:

For example the first network part is introduced into a second mold as an insert. The second reactive composition is then injected on the said insert.

The network assembly according to the present invention is not limited to a network assembly consisting of two parts only. The network assembly may have a sandwich-like structure comprising several polymer networks linked together by applying a reactive composition as defined above comprising a catalyst different from the one used to prepare the parts of the first polymer network (i.e., either a Mo- or W-catalyst or a Ru-catalyst as described above).

For example, two first network parts prepared from the first reactive composition may be put together to create a close cavity and the second reactive composition is poured in and polymerised to obtain a sandwich-like structure consisting of the second network layer sandwiched in between the two first network parts made of the first reactive composition.

As already mentioned above, adhesion to low-surface-tension substrates is particularly problematic. In addition, one major problem associated with bonds formed from an adhesive is the relative susceptibility of the bonds to high temperature fluids and corrosive materials. Adhesives used to join large surface area substrates are even more challenging since the adhesive must be able to withstand the exceptionally high stresses and adverse environmental conditions placed on the adhesive joint.

The present invention overcomes the problems mentioned above in that it entirely avoids such adhesive joints.

As the second reactive composition preferably may have the same composition as the first reactive composition except catalyst, an article can be obtained (such as automotive and truck vehicle bodies and component panels and parts such as doors, roofs and hoods) which has homogeneous properties through its interface such as chemical resistance and thermoexpansion, for example. Accordingly, the network assembly according to the present invention is less prone to become separated than prior art network assemblies obtained by using a conventional adhesive that has a chemical composition different from the compositions of the parts forming the network assembly.

Despite their chemical similarity said first and said second network may be different in that one network contains the additives listed hereinbefore.

For example, according to the present invention, a first polycycloolefin network is prepared by polymerising a first reactive composition comprising a norbornene-type cycloolefin monomer and fibres as filler. The polymerisation is catalysed by using one of a Mo-/W-catalyst or a Ru-catalyst.

The obtained first network comprising the filler material may then be coated with a second reactive composition comprising the aforementioned catalyst that was not used in the preparation of the filler-containing article to be coated, i.e., the Ru-catalyst or one of the Mo-/W-catalyst.

By using this process, a network assembly is obtained that is entirely homogeneous as far as the network is concerned, whereas the filler is not distributed homogeneously throughout the network.

Thus, a further embodiment of the invention relates to a network assembly wherein either the polycycloolefin-Ru-network or the polycycloolefin-Mo/W-network is reinforced or filled with fibres.

Another embodiment relates to a network assembly wherein either the polycycloolefin-Ru-network or the polycycloolefin-Mo/W-network is filled with, for example, polydicyclopentadiene that has been powdered to a very fine level, usually in cryogenic conditions.

According to a further embodiment of the network assembly according to the present invention, one of the polycycloolefin-Ru-network and polycycloolefin-Mo/W-network is a prepreg. For example, a prepreg prepared from a first reactive composition comprising, in addition to the norbornene-type cycloolefin monomers, glass fibres and a Ru-catalyst can be overmolded by a neat second reactive composition (comprising a Mo- or W-catalyst and no glass fibres), where the heat generated by the overmolding reaction completes the crosslinking of the prepreg.

For sound or energy absorption one of the networks of the network assembly according to the present invention may comprise an elastomer. Such a network assembly can be obtained by adding an elastomer as a composite material into a mold when norbornene-type cycloolefin monomers are polymerised.

As understood from the above, one of the reactive compositions used to prepare the network assembly according to the present invention can function as an adhesive so that the present invention also provides a repair kit for molders or OEM. If, for example, an article prepared by polymerisation of dicyclopentadiene using a Mo/W-metathesis catalyst is damaged, i.e., broken, a reactive composition comprising dicyclopentadiene and a ruthenium catalyst can be used to repair the broken part.

Further, this type of reactive composition can also be used to prepare an entirely continuous or homogeneous part made of polydicyclopentadiene, for example, with a dimension that can only be obtained when bonding parts together by using an adhesive. Thus, for example, it is not possible to obtain parts as long as 12 m without the use of conventional adhesives. According to the present invention, however, the use of such conventional adhesives is no longer required so that homogeneous pDCP parts of big dimension can be obtained.

Thus, the present invention further relates to a poly(norbornene-type cycloolefin) composite comprising at least two poly(norbornene-type cycloolefin) parts made by polymerising a first reactive composition comprising a norbornene-type cycloolefin monomer in the presence of a Ru-catalyst to obtain a PCO-Ru-network or by polymerising a first reactive composition comprising a norbornene-type cycloolefin monomer in the presence of a Mo- or W-catalyst to obtain a PCO-Mo/W-network obtainable by a process comprising the following steps:
(i) contacting said at least two poly(norbornene-type cycloolefin) parts with a second reactive composition comprising a norbornene-type cycloolefin monomer and a Mo- or W-catalyst, if a Ru-catalyst was used to prepare said at least two poly(norbornene-type cycloolefin) parts or a Ru-catalyst, if a Mo- or W-catalyst was used to prepare said at least two poly(norbornene-type cycloolefin) parts and
(ii) polymerising said second reactive composition to bond together said at least two poly(norbornene-type cycloolefin) parts to obtain a poly(norbornene-type cycloolefin) composite.

Preferably the composite is a poly(dicyclopentadiene) composite.

Such composites according to the present invention may have dimensions longer than easily transportable parts.

Preferably the composite has at least one dimension longer than 13.5 m which is the dimension of a regular lorry in Europe.

Of course, according to the present invention, composites can be produced that have still larger dimensions.

Thus, in summary, the present invention provides high impact, paintable, engineered parts, possibly large or very large. These parts, despite the fact that they are "assembled", show an excellent combination of stiffness and impact resistance, even at low temperatures (−40° C.). They have good dimensional stability, excellent paint adhesion, high electrical insulation properties, low density and excellent chemical resistance in acids and bases. In particular, the network assembly according to the present invention has long-term resistance to chemicals such as chlorine and soda. The present invention is further illustrated by the following examples:

Example 1

Preparation of Reactants to Make a PolyDCP-W-Network

Reactant A: A mixed solution of polymerization activator is prepared by mixing trioctylaluminum, dioctylaluminum iodide and diglyme at molar ratios of 85:15:100. The mixed solution is added to a mixture consisting of 95 parts by weight of purified dicyclopentadiene, 5 parts by weight of purified ethylidenenorbornene and 3 parts by weight of the above-mentioned ethylene-propylene-ethylidenenorbornene copolymer rubber in an amount to give an aluminum content of 0.015 M to obtain an activator reactant solution A.

Reactant B: Tungsten hexachloride (20 parts by weight) is added to 70 parts by volume of anhydrous toluene under nitrogen. The obtained mixture is mixed with a solution consisting of 21 parts by weight of nonylphenol and 16 parts by volume of toluene to obtain a catalyst solution containing 0.5 M of tungsten. The solution is purged with nitrogen over night to remove the hydrogen chloride gas formed by the reaction of tungsten hexachloride and nonylphenol. A catalyst solution for polymerization is prepared by adding 1 part by volume of acetylacetone to 10 parts by volume of the solution produced by the above procedure. To a monomer mixture consisting of 95 parts by weight of purified dicyclopentadiene and 5 parts by weight of purified ethylidenenorbornene is added 3 parts by weight of an ethylene-propylene-ethylidenenorbornene copolymer rubber having ethylene content of 70 mol % and with 2 parts by weight of Ethanox 702 as an oxidation stabiliser. The obtained solution is mixed with the above catalyst solution for polymerization in an amount to give a tungsten content of 0.005 M and obtain a catalyst reactant solution B.

Example 2

Preparation of Reactants to Make a PolyDCP-Mo-Network

Two percent of phenol antioxidant, Irganox 259, is dissolved in dicyclopentadiene (DCP), which was poured into two containers. In one of them, diethyl aluminum chloride (DEAC), 1-propanol, and silicon tetrachloride are added to DCP in such a way that their concentration is 33 millimols, 42.9 millimols, and 20 millimols, respectively to make reactant A. In the other container, tri(tridecyl) ammonium octamolybdate is added to DCP in such a way that its concentration (atomic Mo) is 8 millimols to make reactant B.

Example 3

Preparation of a PolyDCP-W-Network

Both reactant solutions A and B prepared according Example 1 are mixed together at a ratio of 1:1. The mixture is immediately poured into a 400 mm×300 mm×5 mm plaque mold heated to 80° C. Ring-opening polymerization reaction in the mold is conducted for approximately 3 minutes and then a plaque of poly-DCP based on tungsten catalyst is obtained.

Example 4

Preparation of a PolyDCP-W-Network from Commercially Available Formulation

Component A and B of Metton M1537 from Metton America, Inc are transferred under nitrogen into a Cannon A40 RIM equipment, equipped with a Cannon FPL 10 mixing head connected to a 400 mm×300 mm×5 mm plaque mold heated to 80° C. The components temperature of the RIM machine is set up at 30° C., the output at 200 gr per second. After closing, the tool is then purged under nitrogen during 10 seconds. Both components are mixed at a ratio 1:1 in the mix head and injected during 2.96 seconds. Ring-opening polymerization reaction in the mold is conducted for approximately 90 seconds and then a plaque of poly-DCP based on tungsten catalyst is obtained.

Example 5

Preparation of a PolyDCP-Mo-Network

Both reactant solutions A and B prepared according Example 2 are mixed together at a ratio of 1:1. The mixture is immediately poured into a 400 mm×300 mm×5 mm plaque mold heated to 80° C. Ring-opening polymerization reaction in the mold is conducted for approximately 3 minutes and then a plaque of poly-DCP based on molybdenum catalyst is obtained.

Example 6

Preparation of a PolyDCP-Mo-Network from Commercially Available Formulation

Component A and B of Telene 1650 from Telene SAS are transferred under nitrogen into a Cannon A40 RIM equipment, equipped with a Cannon FPL 10 mixing head connected to a 400 mm×300 mm×5 mm plaque mold heated to 80° C. The components temperature of the RIM machine is set up at 30° C., the output at 200 gr per second. Both components are mixed at a ratio 1:1 in the mixing head and injected during 2.96 seconds. Ring-opening polymerization reaction in the mold is conducted for approximately 90 seconds and then a plaque of poly-DCP based on molybdenum catalyst is obtained.

Example 7

Preparation of a Filled PolyDCP-Mo-Network From Commercially Available Formulation Component A, B and F of formulation RF0501 from Rimtec Corp. are transferred under nitrogen into a Cannon A40 RIM equipment equipped with additional third stream lance piston unit. The F component of this formulation comprises about 56% hybrid mineral fillers dispersed into DCP/tri-CPD solution and has a density of 1.56. The equipment is connected to a Cannon Trio 14 three components mixing head connected to a 400 mm×300 mm×5 mm plaque mold heated to 80° C. The components temperature of the RIM machine is set up at 30° C., the output at 300 ml per second. Components are mixed at a volume ratio of 1:1:1 in the mixing head and injected during 2 seconds in the mold. Ring-opening polymerization reaction in the mold is conducted for approximately 120 seconds and then a plaque of filled poly-DCP based on molybdenum catalyst is obtained.

Example 8

Preparation of a PolyDCP-Ru-Network Using VC 843 Catalyst 10 parts of triCPD from Maruzen Corp. are added at 40° C. to 90 parts of commercial high purity DCP "Ultrene" from Cymetech, llc, under nitrogen and then cooled down. VC 843 is dissolved at a 30,000:1 monomer to catalyst molecular ratio in the monomer solution described above. 0.2% of antioxidant Isonox 132 are added to the above solution. Phenyltrichlorosilane activator is then added to the solution, in a quantity giving a chloride to catalyst mole ratio of 40.

The mixture is then immediately poured into a 400 mm×300 mm×5 mm plaque mold heated to 80° C. Ring-opening polymerization reaction in the mold is conducted for approximately 5 minutes and then a plaque of poly-DCP based on ruthenium catalyst is obtained.

Example 9

Preparation of a PolyDCP-Ru-Network Using VC 881 Catalyst

A reactant solution is prepared according to Example 8 using VC 881 as ruthenium based catalyst. Phenyltrichlorosilane activator is then added to the solution, in a quantity giving a chloride to catalyst mole ratio of 40.

The mixture is then immediately poured into a 400 mm×300 mm×5 mm plaque mold heated to 80° C. Ring-opening polymerization reaction in the mold is conducted for approximately 5 minutes and then a plaque of poly-DCP based on ruthenium catalyst is obtained.

Example 10

Preparation of a PolyDCP-Ru-Network Using C 827 Catalyst

A reactant solution is prepared according to Example 8 using tricyclohexyl-phosphine[1,3-bis(2,4,6-trimethylphenyl)-imidazolidine-2-ylidene][3-methyl-2-butenylidene]ruthenium (IV) dichloride, a ruthenium based catalyst as supplied by Materia Corp. The mixture is then immediately poured into a 400 mm×300 mm×5 mm plaque mold heated to 80° C. Ring-opening polymerization reaction in the mold is conducted for approximately 8 minutes and then a plaque of poly-DCP based on ruthenium catalyst is obtained.

Example 11

Preparation of the Network Assembly and Qualitative Evaluation

One of the plaques freshly prepared according to Examples 4 to 10 is placed into a tool heated at 80° C. and having a 400 mm×300 mm×10 mm cavity, leaving an empty space of dimension 400 mm×300 mm×5 mm on the top of the plaque. A reactive mixture as described in Examples 4 to 10 is then poured into the free space left into the tool, in contact with the first pDCP network surface. Ring-opening polymerization reaction in the mold is conducted for the time mentioned in Examples 4 to 10 and then a plaque of poly-DCP made of 2 networks assembly is obtained. After demolding and cooling down the networks assembly strength is qualitatively evaluated by trying to separate the 2 networks from each other. Results are summarised in the table below:

| First network type | Prepared according to | Second network type | Prepared according to Example 11 using process of | Adhesion strength |
|---|---|---|---|---|
| W | Example 3 | W | Example 3 | No adhesion |
|   | Example 3 | W | Example 4 | No adhesion |
|   | Example 4 | W | Example 3 | No adhesion |
|   | Example 4 | Mo | Example 6 | No adhesion |
|   | Example 4 | Ru | Example 8 | Good adhesion |
|   | Example 4 | Ru | Example 10 | Good adhesion |
| Mo | Example 5 | Mo | Example 5 | No adhesion |
|   | Example 5 | Mo | Example 6 | No adhesion |
|   | Example 6 | Mo | Example 5 | No adhesion |
|   | Example 6 | W | Example 4 | No adhesion |
|   | Example 6 | Ru | Example 8 | Good adhesion |
|   | Example 6 | Ru | Example 10 | Good adhesion |
|   | Example 7 | Ru | Example 8 | Good adhesion |
| Ru | Example 8 | W | Example 4 | Good adhesion |
|   | Example 8 | Mo | Example 6 | Good adhesion |
|   | Example 8 | Mo | Example 7 | Good adhesion |
|   | Example 9 | W | Example 4 | Good adhesion |
|   | Example 10 | W | Example 4 | Good adhesion |
|   | Example 10 | Mo | Example 6 | Good adhesion |

Example 12

Preparation of the Network Assembly and Quantitative Evaluation

Two pDCP-Mo-networks are prepared according to Example 6. The 5 mm thick plaques are then bond together to make lap shear testing sample having an overlap of 20 mm and an adhesive thickness of 3 mm using the preparation described in Example 8 where the Ru catalyst used is VC 843, and where phenyltrichlorosilane activator is added to the solution, in a quantity giving a chloride to catalyst mole ratio of 40. Ring-opening polymerization reaction is conducted at room temperature for approximately 10 minutes. The sample is then post-cured during 1 hour at 60° C. The resulting sample is a sandwich like construction consisting of a pDCP-Ru-network sandwiched between 2 pDCP-Mo-networks.

The same sample preparation is repeated but VC 881 is used as ruthenium based catalyst instead of VC 843.

The resulting samples are then cut into 20 mm wide strip, resulting in lap shear test sample of 20 mm by 20 mm overlap and 3 mm adhesive thickness. These samples are tested on an ADAMEL LHOMARGY DY 35 tractiometer at 2 mm/second speed. The shear strength values are reported in the table below.

| Lap shear value of pDCPD - Mo/W network assembly | | | | | |
|---|---|---|---|---|---|
| First network type | Prepared according to | Second network type | Reactant prepared according | Ruthenium catalyst type | Shear stress (MPa) |
| Mo | Example 6 | Ru | Example 9 | VC843 | 3.4 |
| Mo | Example 6 | Ru | Example 9 | VC881 | 5.0 |

Example 13

Evaluation of pDCP Network Assembly in Highly Corrosive Environment

Lap shear samples are prepared according to Example 12 using VC 881 as ruthenium catalyst and immersed during 20 weeks into a 20% hydrochloric acid solution maintained at 85° C.

After removing the samples from the solution they are tested according to the conditions described in Example 12. The lap shear stress value is measured at 4.3 MPa, or 86% of the initial value.

Example 14 pDCP Network Assembly Made from Prepreg

A pDCP prepreg is made by manually impregnating 5 plies of glass fiber fabric reference IENO 7587-ECG 37-680 gr/m$^2$ from Owens Corning placed into a 400 mm×300 mm×5 mm plaque open mold heated to 80° C. with the reactant preparation described in Example 10 using tricyclohexylphosphine [1,3-bis(2,4,6-trimethylphenyl)-imidazolidine-2-ylidene][3-methyl-2-butenylidene]-ruthenium (IV) dichloride, a ruthenium based catalyst as supplied by Materia Corp. Ring-opening polymerization reaction in the mold is conducted for approximately 10 minutes and then a flexible prepreg of glass reinforced poly-DCP based on ruthenium catalyst is obtained, having an average thickness of 2.5 mm. The network assembly is prepared according to process described in Example 11 using the prepreg plaque as first network assembly and a reactive mixture according to Example 4, except that a 400 mm×300 mm×5 mm plaque closed mold heated to 80° C. is used and the injection time reduced to 1.5 seconds. Ring-opening polymerization reaction in the mold is conducted for approximately 120 seconds. After demolding the 2 pDCP networks cannot be separated.

The invention claimed is:

1. Polycycloolefin (PCO) thermoset network assembly obtained by polymerising a first reactive composition comprising a cycloolefin monomer in the presence of a Mo- or W-catalyst to obtain a PCO-Mo/W-network and polymerising a second reactive composition comprising a cycloolefin monomer in the presence of a Ru-catalyst on said PCO-Mo/W-network to obtain a PCO thermoset network assembly, wherein each cycloolefin monomer is a polycyclic compound containing at least one norbornene moiety.

2. Polycycloolefin (PCO) thermoset network assembly obtained by polymerising a first reactive composition comprising a cycloolefin monomer in the presence of a Ru-catalyst to obtain a first PCO-Ru-network and polymerising a second reactive composition comprising a cycloolefin monomer in the presence of a Mo- or W-catalyst on said PCO-Ru-network to obtain a PCO thermoset network assembly, wherein each cycloolefin monomer is a polycyclic compound containing at least one norbornene moiety.

3. The polycycloolefin (PCO) thermoset network assembly according to claim 1 or 2 wherein either the PCO-Ru-network or the PCO-Mo/W-network is reinforced or filled with fibres.

4. The polycycloolefin (PCO) thermoset network assembly according to claim 1 or 2 wherein the PCO-Ru-network or the PCO-Mo/W-network is filled with polydicyclopentadiene (pDCP) powdered under cryogenic conditions.

5. The polycycloolefin (PCO) thermoset network assembly according to claim 1 or 2 wherein the PCO-Ru-network or the PCO-Mo/W-network is a prepreg.

6. The polycycloolefin (PCO) thermoset network assembly according to claims 1 or 2 having a sandwich structure.

7. The polycycloolefin (PCO) thermoset network assembly according to claims 1 or 2 wherein at least one of the PCO-Ru-network or the PCO-Mo/W-network is crosslinked.

8. The polycycloolefin (PCO) thermoset network assembly according to claims 1 or 2 wherein at least one of the PCO-Ru-network or the PCO-Mo/W-network comprises an elastomer.

9. The polycycloolefin (PCO) thermoset network assembly according to claim 1 or 2 wherein the Mo/W-catalyst is selected from the group consisting of $$[R_4N]_{(2y-6x)}M_xO_y \text{ and } [R_3NH]_{(2y-6x)}M_xO_y$$

wherein O represents oxygen; M represents either molybdenum or tungsten; x and y represent the number of M and O atoms, respectively, in the molecule based on the valence of +6 for molybdenum, +6 for tungsten and −2 for oxygen.

10. The polycycloolefin (PCO) thermoset network assembly according to claim 1 or 2 wherein the Ru-catalyst is selected from the group consisting of the following compounds represented by formulae (IA) and (IB):

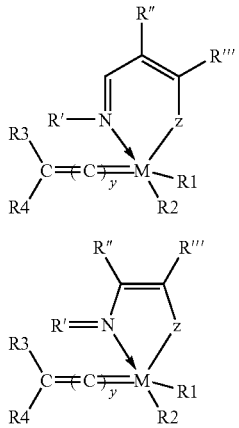

wherein:
M is, ruthenium,
Z is selected from the group consisting of oxygen, sulphur, selenium, NR"", PR"", AsR"" and SbR"";
R", R'" and R"" are each a radical independently selected from the group consisting of hydrogen, $C_{1-6}$ alkyl, $C_{3-10}$ cycloalkyl, $C_{1-6}$ alkyl-$C_{1-6}$ alkoxysilyl, $C_{1-6}$ alkyl-aryloxysilyl, $C_{1-6}$ alkyl-$C_{3-10}$ cycloalkoxysilyl, aryl and heteroaryl, or R" and R'" together form an aryl or heteroaryl radical, each said radical being optionally substituted with one or more, substituents $R_5$ each independently selected from the group consisting of halogen atoms, $C_{1-6}$ alkyl, $C_{1-6}$ alkoxy, aryl, alkylsulfonate, arylsulfonate, alkylphosphonate, arylphosphonate, $C_{1-6}$ alkyl-$C_{1-6}$ alkoxysilyl, $C_{1-6}$ alkyl-aryloxysilyl, $C_{1-6}$ alkyl-$C_{3-10}$ cycloalkoxysilyl, alkylammonium and arylammonium;
R' is either as defined for R", R'" and R"" when included in a compound having the general formula (IA) or, when included in a compound having the general formula (IB), is selected from the group consisting of $C_{1-6}$ alkylene and $C_{3-8}$ cycloalkylene, the said alkylene or cycloalkylene group being optionally substituted with one or more substituents $R_5$;
$R_1$ is a constraint steric hindrance group having a p$K_a$ of at least 15;
$R_2$ is an anionic ligand;
$R_3$ and $R_4$ are each hydrogen or a hydrocarbon radical selected from the group consisting of $C_{1-20}$ alkyl, $C_{1-20}$ alkenyl, $C_{1-20}$ alkynyl, $C_{1-20}$ carboxylate, $C_{1-20}$ alkoxy, $C_{1-20}$ alkenyloxy, $C_{1-20}$ alkynyloxy, aryl, aryloxy, $C_{1-20}$ alkoxycarbonyl, $C_{1-8}$ alkylthio, $C_{1-20}$ alkylsulfonyl, $C_{1-20}$ alkylsulfinyl $C_{1-20}$ alkylsulfonate, arylsulfonate, $C_{1-20}$ alkylphosphonate, arylphosphonate, $C_{1-20}$ alkylammonium and arylammonium;
R' and one of $R_3$ and $R_4$ may be bonded to each other to form a bidentate ligand;
R'" and R"" may be bonded to each other to form an aliphatic ring system including a heteroatom selected from the group consisting of nitrogen, phosphorous, arsenic and antimony;
$R_3$ and $R_4$ together may form a fused aromatic ring system, and y represents the number of sp$_2$ carbon atoms between M and the carbon atom bearing $R_3$ and $R_4$ and is an integer from 0 to 3 inclusive,
salts, solvates and enantiomers thereof.

11. The polycycloolefin (PCO) thermoset network assembly according to claim 1 or 2 wherein the Ru-catalyst is selected from the group consisting of the following compounds:

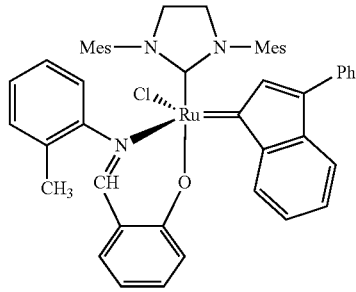

(VC 843)

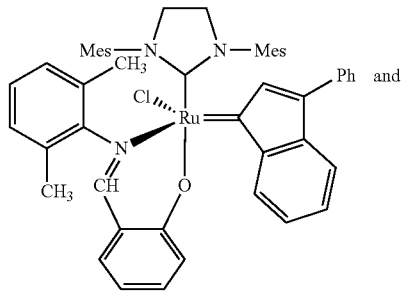

(VC 857) and

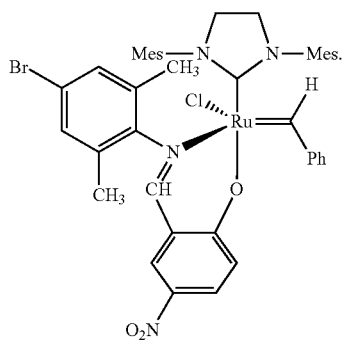

(VC 881)

VC-881

12. The polycycloolefin (PCO) thermoset network assembly according to claim 1 or 2 having a dimension obtained only by bonding parts together, wherein said reactive composition is used as an adhesive.

13. The polycycloolefin (PCO) thermoset network assembly of claim 1, wherein said cycloolefin monomer is a bicyclic, tricyclic, tetracyclic, pentacyclic, hexacyclic, or heptacyclic compound, wherein said compound is further optionally substituted by one or more substituents selected from the group of an alkyl group having 1 to 6 carbon atoms, an alkenyl group having 2 to 6 carbon atoms, an alkylidene group having 2 to 6 carbon atoms, a saturated or unsaturated hydrocarbon cyclic group having 3 to 12 carbon atoms, an aryl group having 6 to 14 carbon atoms, an ester group, an ether group, a cyano group, and a halogen group.

14. The polycycloolefin (PCO) thermoset network assembly of claim 1, wherein said cycloolefin monomer is selected from the group consisting of 2-norbornene, 5-methyl-2-norbornene, 5,6-dimethyl-2-norbornene, 5-ethyl-2-norbornene, 5-butyl-2-norbornene, 5-hexyl-2-norbornene, 5-octyl-2-norbornene, 5-phenyl-2-norbornene, 5-dodecyl-2-norbornene, ethylidenenorbornene methyltetracyclododecene, 2,5-norbornadiene, 2-propyl-2,5-norbornadiene, 2-ethyl-2,5-norbornadiene, 1,4-bis[2-(2,5-norbornadienyl)]butane, 1-methyl-2,5-norbornadiene, 7-isopropylidene-2,5-norbornadiene, 7-sec-butylidene-2,5-norbornadiene, dicyclopentadiene, trimer of cyclopentadiene, methylcyclopentadiene dimer, methylnorbornene (MNB), methyltetracyclododecene (MTD), dicyclopentadiene (DCP), and methylcyclopentadiene dimer (MCDD).

15. The polycycloolefin (PCO) thermoset network assembly of claim 10, wherein each said radical is optionally substituted with 1 to 3 substituents $R_5$ as defined therein.

16. A process for the preparation of a PCO thermoset network assembly comprising the following steps:
  (i) polymerising a first reactive composition comprising a cycloolefin monomer in the presence of a Mo- or W-catalyst to obtain a PCO-Mo/W-network and
  (ii) polymerising a second reactive composition comprising a cycloolefin monomer in the presence of a Ru-catalyst on said PCO-Mo/W-network to obtain a PCO network assembly,
wherein each cycloolefin monomer is a polycyclic compound containing at least one norbornene moiety.

17. A process for the preparation of a PCO thermoset network assembly comprising the following steps:
  (i) polymerising a first reactive composition comprising dicyclopentadiene in the presence of a Ru-catalyst to obtain a first PCO-Ru-network and
  (ii) polymerising a second reactive composition comprising a cycloolefin monomer in the presence of a Mo- or W-catalyst on said PCO-Ru-network to obtain a PCO thermoset network assembly,
wherein the cycloolefin monomer is a polycyclic compound containing at least one norbornene moiety.

18. A poly(cycloolefin) composite comprising at least two poly(cycloolefin) parts made by polymerising a first reactive composition comprising a norbornene-type cycloolefin monomer in the presence of a Ru-catalyst to obtain a PCO-Ru-network or by polymerising a first reactive composition comprising a cycloolefin monomer in the presence of a Mo- or W-catalyst to obtain a PCO-Mo/W-network obtainable by a process comprising the following steps:
  (i) contacting said at least two poly(cycloolefin) parts with a second reactive composition comprising a cycloolefin monomer and a Mo- or W-catalyst, if a Ru-catalyst was used to prepare said at least two poly (cycloolefin) parts or a Ru-catalyst, if a Mo- or W-catalyst was used to prepare said at least two poly(cycloolefin) parts and
  (ii) polymerising said second reactive composition to bond together said at least two poly(cycloolefin) parts to obtain a poly(cycloolefin) composite,
wherein each cycloolefin monomer is a polycyclic compound containing at least one norbornene moiety.

19. The composite according to claim 18 wherein said cycloolefin is dicyclopentadiene.

20. The composite according to claim 18 having at least one dimension longer than 13.5 m.

* * * * *